United States Patent [19]

Tuunanen

[11] Patent Number: 4,993,494
[45] Date of Patent: Feb. 19, 1991

[54] HORSESHOE

[76] Inventor: Arne Tuunanen, Sallerupsvägen 6, S-212 Malmo, Sweden

[21] Appl. No.: 263,777
[22] PCT Filed: Apr. 16, 1987
[86] PCT No.: PCT/SE87/00197
   § 371 Date: Dec. 5, 1988
   § 102(e) Date: Dec. 5, 1988
[87] PCT Pub. No.: WO87/06097
   PCT Pub. Date: Oct. 22, 1987

[30] Foreign Application Priority Data

Apr. 18, 1986 [SE] Sweden .............................. 8601777-9

[51] Int. Cl.⁵ ................................................ A01L 5/00
[52] U.S. Cl. .................................. 168/4; 168/DIG. 1
[58] Field of Search ........................... 168/4, 12, 13, 29

[56] References Cited

U.S. PATENT DOCUMENTS

| 922,408 | 5/1909 | Fawkes | 168/4 |
| 924,790 | 6/1909 | Kane | 168/13 X |

FOREIGN PATENT DOCUMENTS

| 616692 | 8/1935 | Fed. Rep. of Germany | 168/13 |
| 719606 | 2/1932 | France | 168/13 |
| 393427 | 6/1933 | United Kingdom | 168/4 |

Primary Examiner—Robert P. Swiatek

[57] ABSTRACT

A horseshoe (1) conformed substantially to the U-shaped sole of the hoof and having a reinforcing insert (16) of a flexible and, alternatively, partially curable material and a portion (17) which encloses the insert (16) and is made of an elastic friction material. The insert (16) is narrower than the width of the U-shaped sole such that thrust, shock and shear loads generated as the horse moves at a walking, trotting or galloping pace are elastically absorbed by the portion (17) enclosing the insert. The insert (16) comprises four surfaces extending along the entire shoe, at least three of which, the lower, the outer and the inner one (9), are provided with longitudinal grooves (10, 11, 18), the lower groove (18) preferably having a tapering cross-section to receive and guide the tapered nails for attaching the shoe, and the grooves (10, 11) in the outer and inner surfaces (9) serving on the one hand to increase the total surface area of the insert and make the vulcanisation surface thereof larger and, on the other hand, to make the finished shoe more easily adjustable.

12 Claims, 1 Drawing Sheet

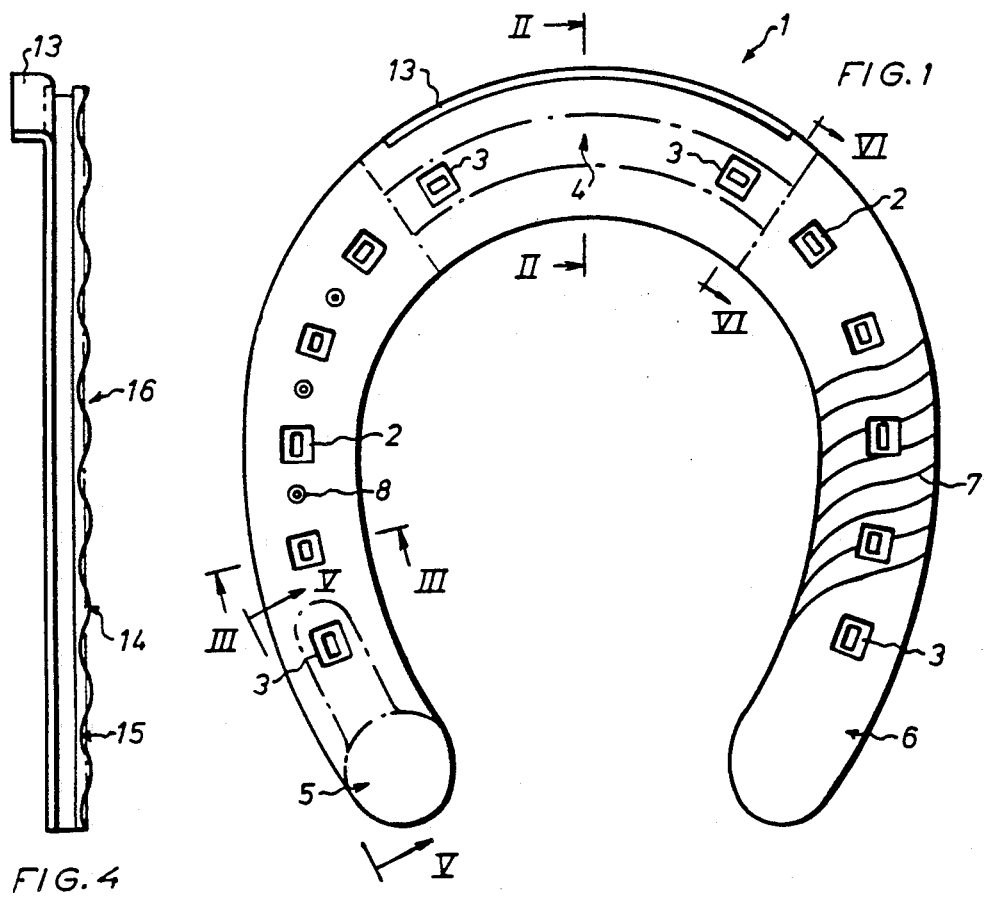
FIG. 1  FIG. 4
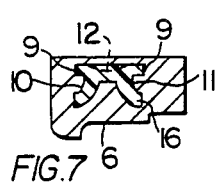 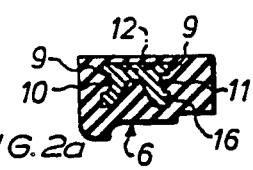 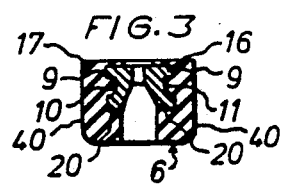
FIG. 7  FIG. 2a  FIG. 3
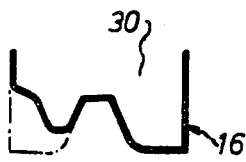 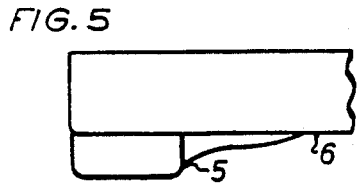 
FIG. 6  FIG. 5  FIG. 2b

HORSESHOE

The present invention relates to a horseshoe conformed substantially to the U-shaped sole of the hoof and having a reinforcing insert of a flexible material and a portion which encloses the insert and is made of an elastic friction material.

Prior art horseshoes mainly aim at providing better friction to various substrates and making the shoe lighter. It has also been endeavoured to provide a non-skid shoe, see for example DE Offenlegungsschrift No. 3,219,091 or DE Offenlegungsschrift No. 2,604,607. The main problem is, however, the fixation of the nails for attaching the shoe. When the horse is moving, the nails waggle concurrently with the deformation of the elastic material and eventually break owing to fatigue. Also various types of metal insert have been tried but, because of the shape of the insert, the hammer used for adjusting and attaching the shoes has created fissures in the material surrounding the insert.

The main object of the horseshoe according to the invention is to reduce the risk of injuries to the horse as a consequence of its slipping in stables or on hard roadways and to provide the horse with a permanent soft support which resembles the natural sole. Since slipping on hard concrete or asphalt substrates frequently causes sprained muscles or fractures which heal very slowly or, perhaps, never at all, such a shoe has long been keenly desired, especially by turf people.

A further object of the horseshoe according to the invention is to reduce the risk of fire in stables with concrete floors, where conventional metal horseshoes easily generate sparks when the horse paws the floor.

Another object of the horseshoe according to the invention is to reduce the risk of self-inflicted injuries to the horse, such as when the horse is galloping or trotting and strikes one foot against the other. Also the risk of injuries which grazing horses cause each other by kicking, can be reduced by means of this shoe.

A still further object is to provide a horseshoe which is easily formable by hand and which comprises an insert which, when the nails for fixing the shoe are driven into the hoof, safely guides and fixes the nails in the shoe. This is achieved in that the nail guides taper, and in that the shoe surface engaging the hoof is also covered by an elastic material to prevent the shoe from sliding on the hoof. Furthermore, the shoe can be more easily attached as compared with presentday shoes and may in special cases, e.g. for cross-country racing, also be glued to the rear parts of the hoof, the so-called quarters.

To achieve these objects, the horseshoe according to the invention is characterised in that the insert is narrower than the width of the U-shaped sole of the hoof such that thrust, shock and shear loads are elastically absorbed by the portion enclosing the insert.

The shoe according to the invention reduces the risk of slipping in stables and on concrete or asphalt type substrates, and at the same time the horse is given a permanent soft support which resembles the natural sole and is easy on the joints. The reduced risk of slipping also means less risk of sprained muscles and other injuries. The fact that the shoe according to the invention is much softer than conventional shoes also reduces the risk of injuries due to trampling. The shoe can also be more easily attached to the hoof than conventional metal shoes, mainly because it is easier to adjust.

The invention will be described in greater detail below, reference being had to the accompanying drawings in which FIG. 1 is a view of the shoe as seen from underneath, FIGS. 2a and 2b are sections along line II—II in FIG. 1, with and without an attachment member as described below, FIG. 3 is a section along line III—III in FIG. 1, and shows an alternative to the embodiment shown in FIGS. 2a, b.

FIG. 4 is a lateral view of the insert and shows two alternative embodiments,

FIG. 5 is a lateral view of a heel calk attached to the shoe, and

FIG. 6 is a cross-sectional view along line VI—VI in FIG. 1 and shows an alternative embodiment of the insert.

FIG. 7 shows an alternative embodiment of the view of FIGS. 2a and 2b.

FIG. 1 shows that the lower side of a substantially U-shaped horseshoe 1 comprises two sets of six rectangular holes 2, 3 which may all be used for driving in conventional horseshoe nails. The outermost holes 3 of each set are, however, primarily intended to receive different attachment members 4, 5 to adapt the shoe to different substrates. Such attachment members 4, 5 are mounted by inserting pins arranged on the attachment members 4, 5 into corresponding rectangular nail holes 3 and by gluing to the wearing surface 6 of the shoe. The wearing surface 6 may be provided with sipes 7 or other pattern to increase the grip on slippery substrates. To this end, the wearing surface may further be provided with studs 8 between the nail holes.

FIGS. 2a and 2b are cross-sectional views of the shoe with a plastically ductile insert 16.

FIG. 2a shows a stepped cross-sectional view of one embodiment without a toe calk attached wherein the base of the highest step is adapted to adjoin the outer side of the hoof. FIG. 2b shows another embodiment of a toe calk 4 attached to the shoe 1, and showing the provision of grooves 10, 11 in the lateral surfaces 9 of the insert 16. It also appears that the grooves impart to the cross-section of the insert the approximate form of, on the one hand, an X-beam and, on the other hand, a U-beam, the two forms being superimposed such that a slightly deformed X is created. In FIG. 2a, a dashed line indicates a further groove 12 which is provided in the upper side of the insert 16 and which is intended for e.g. training shoes. Shoes for ordinary use are normally also provided with at least one toe cap 13 as shown in FIGS. 1 and 4.

Attention is here called to the position of the insert 16 in the lateral direction of the shoe. The insert must be positioned along the line in the hoof where the horse has no sense of feeling, the so-called white line. At the front of the hoof, this line extends closer to the outer wall than at the rear of the hoof (compare FIGS. 2a, 2b with FIG. 3), and the insert must be positioned correspondingly since it would cause acute pain and even injury to the horse if the nails were driven in beside the white line.

FIG. 3 illustrates what has been said in connection with FIGS. 2a, b, viz. that the insert is equidistantly spaced from the two lateral surfaces 40 of the shoe.

FIG. 4 is a lateral view of the insert, and shows two alternative embodiments, one of which is marked with a dash-dot line. In the other embodiment, the lower surface 14 of the insert 16 is provided with indentations 15 so as to increase the surface area thereof and give the surface an irregular shape for the reasons indicated below.

A portion 17 enclosing the insert 16 as shown in FIGS. 2a, b and 3 is made of elastic material, preferably a rubber type elastomer, which has been vulcanised to the insert. Since it is most important to obtain a lasting connection between the elastomer and the insert, the insert 16 is provided with the said indentations 15 so that, regardless of where the load is applied, the enclosing portion 17, by being attached to an irregular surface, may absorb the load in the best possible way.

FIG. 6 shows a further alternative embodiment of the insert which here has substantially the same cross-section as before, except that it is smaller and is provided with at least one open or closed cavity or channel 30 extending in the longitudinal direction of the insert. Furthermore, the design of the front end of the insert has been slightly modified. If the channel 30 is open, it opens toward the hoof, and in the area of the opening the material enclosing the insert is transmissive to, for example, ultraviolet light. If the channel is closed, and if it is not transmissive to ultraviolet light, use is made of e.g. microwave radiation to achieve the same purpose, viz. curing (see below). A separate element of a curable composite type material is applied to the channel. A reinforcement comprising, for example, aramide fibres, glass fibres, carbon fibres or acrylic fibres is part of the composite material. The material enclosing the reinforcement comprises, for example, an acrylic compound, epoxy resin, acrylic gel or urethane resin and may have components which, for example, make it thermosetting or curable by ultraviolet light. Curing can also be carried out in some other manner, for example by adding some type of hardener to the material in the channel. The hardener can be distributed in different ways. Already in connection with the manufacture of the insert, e.g. thin hardener capsules can be positioned in the resin and, on adjustment of the shoe, be deformed, burst, collapse, and be emptied. It is also possible to introduce, by means of a syringe, a suitable hardener via a perforated tube which extends along the entire shoe and which has been inserted previously or is inserted only temporarily. By such a design of the insert, the shoe may first be readily adjusted and then, after curing, become rigid such that the desired shape is preserved.

The insert may be made of an elastically deformable plastics material which has been integrated with a slightly more rigid, plastically ductile part of metal extending in the longitudinal direction of the insert, as shown in FIG. 7. The insert may have integrated therein with an inner portion of another and more rigid material, of a thick steel wire or a plastics material which is rigid at the temperature of use ($-30°$ C. to $+70°$ C.) but ductile at higher temperatures (above $70°$ C.).

The horseshoe according to the invention is intended for use both on very hard asphalt and cement substrates and on soft, perhaps even muddy tracks. To this end, the shoe is furnished with facilities to receive different attachment members, such as the toe calk 4 shown in FIG. 2b, which is intended mainly for gallopers, but also heel calks 5 of the type as shown in FIG. 5. These attachment members are adapted to be glued to the wearing surface 6 of the shoe 1 and, as mentioned above, to be mounted also in one or more of the nail holes 3. Attachment members 4, 5 of this type are intended to be worn down fairly quickly, which means that if, for example, a horse is reshod just before a race and if, at the same time, one or more of the attachment members here shown are mounted alone or in combination, the horse need not be reshod after the race but can continue on the same shoes. This is advantageous in several aspects, especially from the economic point of view.

A fact which should also be mentioned is that the horseshoe according to the invention weighs much less than the shoes now available (up to 50–60 g less), which also contributes to reduce the risk of injuries to the horse's joints and tendons.

I claim:

1. A horseshoe (1) conformed substantially to the U-shaped sole of the hoof and having a reinforcing insert (16) of a flexible material and a portion (17) which encloses said insert (16) and is made of an elastic friction material, wherein said insert (16) is narrower than the width of the U-shaped sole such that thrust, shock and shear loads are elastically absorbed by the portion (17) enclosing said insert, characterised in that said insert comprises at least one channel (30) which extends in the longitudinal direction of the insert and in which a separate element of a curable composite material is positioned, said composite material being caused to cure in situ only after said insert has been given its final shape.

2. A horseshoe as claimed in claim 1, characterised in that the insert is made partly of a pure or alloyed soft metal.

3. A horseshoe as claimed in claim 1, characterised in that said reinforcing insert (16) is made of a plastics material which has been integrated with an inner portion of another and more rigid material which is rigid at the temperature of use ($-30°$ C. to $+70°$ C.) but ductile at higher temperatures (above $70°$ C.).

4. A horseshoe as claimed in claim 1, characterised in that said insert is made of an elastically deformable plastics material which has been integrated with a slightly more rigid, plastically ductile part of metal extending in the longitudinal direction of the insert.

5. A horseshoe as claimed in any one of the preceding claims, characterised in that said portion enclosing the insert (16) is made of a rubber material.

6. A horseshoe as claimed in claim 5, characterised in that said portion of rubber material enclosing the insert is vulcanised to the insert.

7. A horseshoe as claimed in claim 6, characterised in that said insert (16) has four surfaces extending along the entire shoe, at least three of which, the lower, the outer and the inner surface, being provided with longitudinal grooves (18, 10, 11), of which the groove (18) in the lower surface has a tapering cross-section to receive and guide tapering nails for attaching the shoe, and of which the grooves (10, 11) in the outer and inner surfaces (9) serve to increase the total surface area of the insert, thereby to obtain a larger vulcanising surface and make the finished shoe more easily adjustable.

8. A horseshoe as claimed in claim 7, characterised in that a longitudinal groove (12) in the upper surface of said insert (16) is adapted to be filled, on vulcanisation, by an elastomer to provide a shoe which is soft to the hoof.

9. A horseshoe as claimed in claim 8, characterised in that the lower surface (14, 20) of the insert is provided with indentations (15) facing the wearing surface (6) of the shoe, said indentations serving to further increase the vulcanising surface area of the shoe and to make the loads exerted on the vulcanisation joint between the insert and the enclosing material constitute a combination of thrust, shock and shear loads.

10. A horseshoe as claimed in any one of claims 1-4, characterised in that the wearing surface (6) of the finished shoe (1) comprises sipes (7) and/or a pattern to further increase the grip on slippery substrates.

11. A horseshoe as claimed in any one of claims 1-4, characterised in that it comprises preferably six rectangular nail holes (2, 3) in each shoe-half, the middle four (2) in each half being intended for conventional nails and the remaining ones (3) being adapted to receive toe calks (4) or special heel calks (5) attachable to the wearing surface (6) of the shoe.

12. A horseshoe as claimed in any one of claims 1-4, characterised in that the cross-section of the shoe (1) is stepped, the base of the highest step adjoining the outer side of the hoof.

* * * * *